US006296088B1

United States Patent
Carlson

(10) Patent No.: US 6,296,088 B1
(45) Date of Patent: Oct. 2, 2001

(54) MAGNETORHEOLOGICAL FLUID SEISMIC DAMPER

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/355,364

(22) PCT Filed: Feb. 24, 1997

(86) PCT No.: PCT/US97/02743

§ 371 Date: Sep. 16, 1999

§ 102(e) Date: Sep. 16, 1999

(87) PCT Pub. No.: WO98/37339

PCT Pub. Date: Aug. 27, 1998

(51) Int. Cl.[7] .................................................. F16F 9/53
(52) U.S. Cl. ......................................... 188/267.2; 52/167.1
(58) Field of Search .............................. 52/167.1, 167.4; 248/636, 638, 562; 188/267, 267.2

(56) References Cited

U.S. PATENT DOCUMENTS

| | | | |
|---|---|---|---|
| 5,174,552 | * 12/1992 | Hodgson et al. | 267/140.11 |
| 5,277,281 | * 1/1994 | Carlson et al. | 188/267 |
| 5,632,361 | * 5/1997 | Wulff et al. | 188/267 |
| 5,878,851 | * 3/1999 | Carlson et al. | 188/269 |
| 6,095,486 | * 8/2000 | Ivers et al. | 188/267 |

FOREIGN PATENT DOCUMENTS

2579283 * 3/1985 (FR) ...................................... 188/267

* cited by examiner

*Primary Examiner*—Robert J Oberleitner
*Assistant Examiner*—Devon Kramer
(74) *Attorney, Agent, or Firm*—Randall S. Wayland; Michael M. Gnibus

(57) ABSTRACT

A seismic MR damper for providing controllable damping forces between a first structural member and a second structural member within large structures, such as buildings, bridges, etc. The seismic damper includes a damper body having a hollow cavity and at least one aperture, at least one piston rod slidably received within the aperture, a piston assembly attached to the at least one piston rod and axially moveable within, and subdividing, the said hollow cavity into a first fluid chamber and a second fluid chamber, a controllable passageway for controlling flow between the first fluid chamber and second fluid chamber, a magnetorheological fluid including soft-magnetic particles disbursed within a carrier liquid contained in said controllable passageway, first fluid chamber, and second fluid chamber, and a plurality of alternately-wound coils for generating a plurality of magnetic fields which are directed to act upon the magnetorheological fluid contained in said controllable passageway to generate rheology changes thereby restricting flow of the magnetorheological fluid through the controllable passageway.

20 Claims, 1 Drawing Sheet

MAGNETORHEOLOGICAL FLUID SEISMIC DAMPER

FIELD OF THE INVENTION

This invention relates to the area of controllable fluid devices. Specifically, it relates to controllable fluid devices which utilize a magnetorheological (magnetically controllable) fluid.

BACKGROUND OF THE INVENTION

Dampers are known which use a hydraulic fluid as the working medium to create damping forces to control motion, shock, and/or vibration. One special class of these devices is controllable. In particular, controllable dampers are known which include Electrorheological (ER) fluids, Electrophoretic (EP) fluids, Magnetorheological (MR) fluids, and Hydraulic fluids (Semi-active), etc. Examples of ER-type dampers may be found in U.S. Pat. No. 5,029,677 to Mitsui. Descriptions of EP-type dampers may be found in U.S. Pat. No. 5,018,606 to Carlson. Examples of Semi-Active hydraulic dampers and valves may be found in U.S. Pat. No. 3,807,678 to Karnopp et al. and U.S. Pat. No. 5,207,774 to Wolfe et al.

Of particular interest are Magnetorheological (MR) fluid dampers, as they only require small electrical currents (typically several amps or less) and do not present the potential shock hazard of ER devices, because they operate on much lower voltage (typically 12 volts or less). MR fluid dampers employ a controllable Magnetorheological (MR) fluid comprised of small softmagnetic particles dispersed within a liquid carrier. Typical particles include carbonyl iron, or the like, having various shapes, but which are preferably spherical, and which exhibit mean diameters of between about 0.1 $\mu$m to 500 $\mu$m, and more preferably between about 1 $\mu$m and 100 $\mu$m. The carrier fluids include various known hydraulic oils, and the like. These MR fluids exhibit a thickening behavior (a rheology change), sometimes referred to as an "apparent viscosity change", upon being exposed to a magnetic field of sufficient strength. The higher the magnetic field strength to which the MR fluid is exposed, the higher the damping force that can be achieved within the particular MR damper.

In particular, MR fluid devices provide ease of controllability through simple fluctuations in the electrical current supplied to the magnetic field generator (generally a wound-wire coil). Notably, MR fluids and dampers have demonstrated durability yet unobtained with ER devices (which exhibit a change in rheology upon being exposed to "electric" fields). Further, MR devices provide simplicity previously unachieved with controllable Semi-Active devices, in that the controllable valves have few, or no, moving parts. Descriptions of prior art MR dampers may be found in U.S. Ser. No. 08/674,179 entitled "Controllable Vibration Apparatus" and U.S. Pat. Nos. 5,492,312, 5,284,330, and 5,277,281, all of which are commonly assigned to the assignee of the present invention.

Recently, the use of MR dampers has been proposed for control of civil engineering structures for earthquake hazard mitigation. MR dampers offer the ability to be controlled using low power, thus, they are highly adaptable to battery power operation. Notably, loss of the main electrical power source during a seismic event is a reality that must be contended with, making MR dampers an attractive candidate. However, as in most applications, modest or low cost and high performance are required. Further, the fluids used must be able to withstand long stationary periods and not settle out. Therefore, there is a need for a low cost, reliable, and high performance damper for seismic applications.

SUMMARY OF THE INVENTION

In light of the advantages and drawbacks of prior art systems, the present invention is a magnetorheological fluid seismic damper for attachment between a first structural member and a second structural member such as in a building, bridge, or other like large structure. The MR seismic damper provides real-time controllable damping (dissipation) forces. These forces may be rapidly switched according to an appropriate control algorithm.

In a first novel aspect, the MR seismic damper is comprised of a damper body having a hollow cavity formed therein which includes at least one aperture. At least one piston rod is slidably received within the at least one aperture. Means are included for attaching the damper body to the first structural member, as well as means for attaching the at least one piston rod to the second structural member. A piston assembly is attached to the at least one piston rod and is axially moveable within said hollow cavity thereby subdividing same into a first and second fluid chambers. A controllable passageway is provided for controlling flow between the first fluid chamber and the second fluid chamber. Contained within the controllable passageway, and the first and second fluid chambers is a Magnetorheological (MR) fluid. The MR fluid includes soft-magnetic particles dispersed within a carrier liquid. A plurality of alternately wound coils are wound about a piston core forming a piston assembly which generates a plurality of magnetic fields which are directed by pole pieces on the piston core to act upon the MR fluid contained in said controllable passageway. This generates "rheology" changes and restricts flow of the MR fluid through the controllable passageway.

It is an advantage of the present invention seismic MR damper that it has low power requirements such that it can be operated on battery power during a seismic event.

It is an advantage of the present invention seismic MR damper that large damping forces on the order of 40,000 lbf (178,000 N), or more, may be generated.

It is an advantage of the present invention seismic MR damper that it is time-stable, in that it can be placed in service for many years without requiring any significant maintenance.

It is an advantage of one aspect of the present invention seismic MR damper that it may use a MR fluid which is highly resistant to settling.

It is an advantage of one aspect of the present invention seismic MR damper that it may be rapidly switched from full on to full off in 0.15 seconds or less.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE PREFERRED EMBODIMENTS

Figure 1:
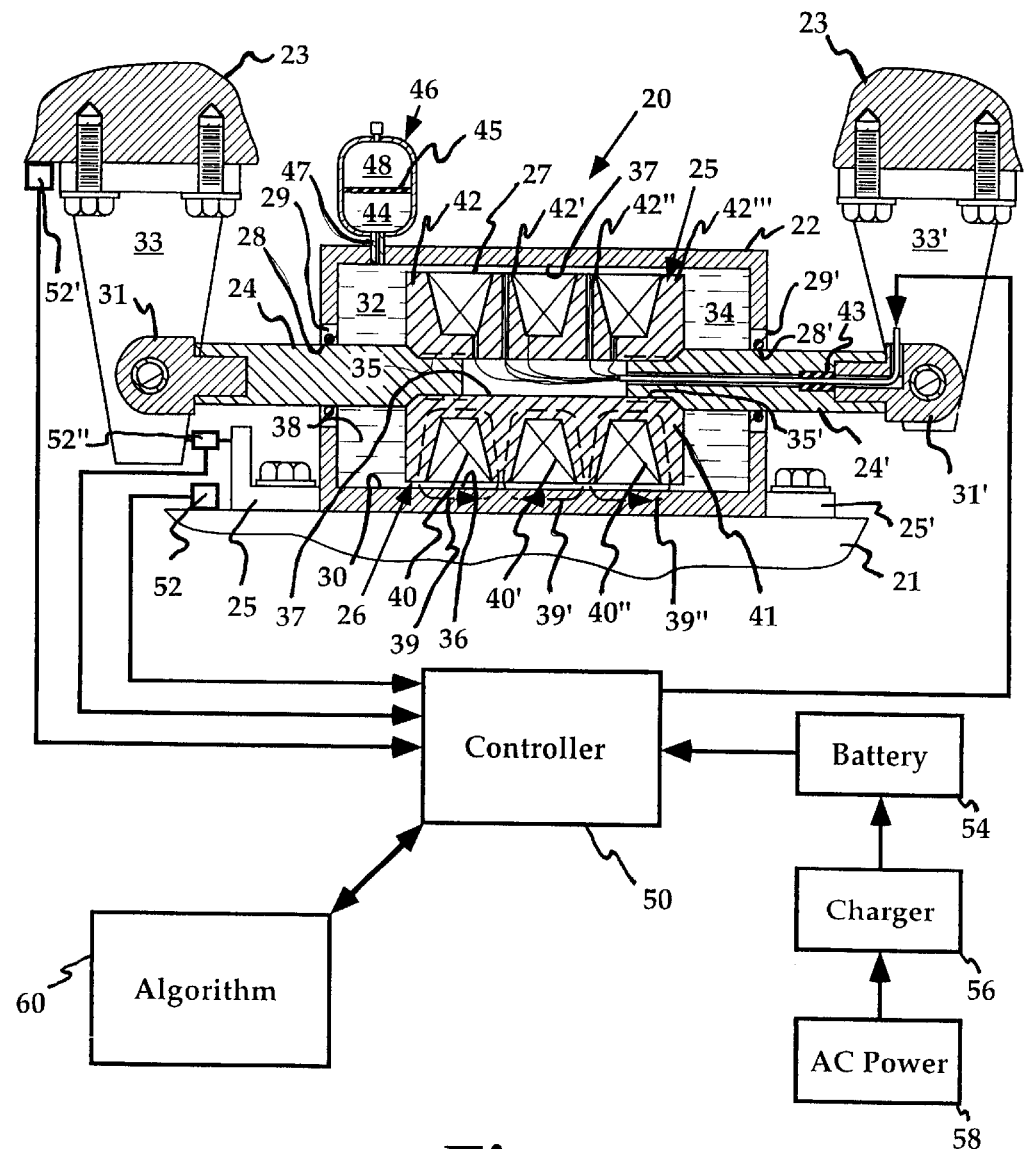
FIG. 1 illustrates a partial cross-sectioned side view of a MR seismic damper and system including same.

Referring now to the Drawings where like numerals denote like elements, in FIG. 1, shown generally at 20, is a preferred embodiment of a seismic MR damper. The seismic damper 20 provides controllable damping forces between a first structural member 21 (such as a first portion of a building or bridge) and a second structural member 23, (such as a second portion of a building or bridge). Likewise, the seismic damper 20 may be used for control of vibrations/movement in other large civil engineering structures due to wind loads/motions. The seismic damper 20 comprises a damper body 22, which is preferably a partially closed-ended hollow cylinder manufactured from a magnetically-soft material, such as low-carbon steel. The damper body 22 has a hollow cavity 30 within and at least one circular aperture, and preferably two apertures 28, 28' formed in the ends thereof.

At least one piston rod, and preferably two piston rods 24, 24', are axially slidably received within the at least one, and preferably two apertures 28, 28'. The circular apertures 28, 28' preferably include bearing and seal assemblies 29, 29' secured therein. Bearing an seal assemblies 29, 29' seal the hollow cavity 30 to prevent escape of fluid and support radial loads. The bearing portion also maintains the appropriate clearances (gap) between the piston assembly 26 and damper body 22. The means for attaching said damper body 22 to the first structural member 21 comprises flanges 25, 25' formed on damper body and bolts, pins, weldments, or the like. Likewise, the means for attaching the at least one, and preferably two, piston rods 24, 24' to the second structural member 23 comprises rod ends 31, 31' threadedly secured to piston rods 24, 24' and brackets 33, 33', secured to second structural member 23 by bolts, pins, weldments, or the like.

The piston assembly 26 is threadedly attached to said at least one, and preferably two piston rods 24, 24' by way of threaded ends 35, 35' formed on piston rods 24, 24'. The piston assembly 26 is axially moveable within the hollow cavity 30 thereby dividing same into a first fluid chamber 32 and second fluid chamber 34. Notably, the gap between the piston assembly 26 and inner diameter of damper body 22 defines the controllable passageway 36. That gap is preferably has a dimension between about 0.04–0.08 in (1 to 2 mm) and most preferably about 0.060 in (1.5 mm).

The controllable passageway 36 is preferably annular-shaped and is formed between the outer radial periphery 27 of the piston assembly 26 and the inner diameter 37 of damper body 22. By way of example, the outer diameter is piston assembly 26 is about 7.88 in (20.0 cm) and the length of piston assembly 26 is about 8.835 in (22.4 cm). By energizing the plurality of alternately wound coils 40, 40', 40" with the appropriate electrical current (generally about 1 Amp - requiring power of about 22 watts), magnetic fields 39, 39', and 39" are generated of sufficient strength to control flow of MR fluid 38 between the first fluid chamber 32 and said second fluid chamber 34. It is important to alternately wind the coils 40', 40", 40"' such that the individual magnetic fields are additive in pole pieces 42', 42". For example, coils 40, 40" would be wound circumferentially in the clockwise direction (CW) about piston core 41, while coil 40' would be wound in the counter-clockwise direction (CCW). The pole pieces 42, 42', 42", 42"' are preferably tapered at an angle of about 9 degrees to prevent saturation. Coils 40', 40", 40"' each comprise about 1250 turns of 16 gauge (0.051 in diameter) (1.29 mm diameter) coated magnet wire. The wires going to and departing from each coil 40', 40", 40"' are threaded through small radially-formed holes in the piston core 25 and emerge into a wire cavity 37. The wires then exit the wire cavity 37 through a bore formed down the centerline of piston rod 24'. Wires preferably pass through a hermetic seal 43 to prevent any escape of fluid.

Potting material (epoxy or the like) preferably fills cavity 37 and is painted over the outer diameter of coils 40', 40", 40"' to further protect them.

A magnetorheological fluid 38 referred to a "licorice custard" is preferable for use in seismic dampers. The fluid 38 described herein was discovered by the inventor to be desirable for a long-life seismic damper. As life is largely determined by settling of the fluid, as the cycles seen are generally minimal. The MR fluid 38 preferably includes soft-magnetic particles, such as reduced carbonyl iron particles, which are preferably spherically shaped, and which exhibit mean diameters between about 0.1 $\mu$m and 500 $\mu$m, and more preferably between about 1 $\mu$m and 100 $\mu$m. Preferably, the reduced carbonyl iron particles comprise about 86.2% by weight, but may be in the range of between about 50% and 90% by weight. The iron particles are disbursed within a carrier liquid, such as a synthetic hydrocarbon oil, which is available under the tradename PERMAVIS 8 from Kurt Lesker of Clairton, Pa. The synthetic hydrocarbon oil preferably comprises about 13.3% by weight, but may be in the range of between 10% and 50% by weight. Preferably, the MR fluid 38 includes a silica thixotropic agent, such as fumed silica available under the tradename CAB-O-SIL EH-5 from Cabot Corp. of Boston, Ma. The thixotropic agent comprises about 0.1% by weight, but may be in the range of between 0.05% and 1% by weight. Additionally, other additives, such as lithium hydroxostearate (available from Witco Corp. of Greenwich, Ct.) may be added. This additive preferably comprises about 0.5% by weight, but may be in the range of between 0.05% and 2% by weight.

These additives gives the MR fluid 38 its excellent anti-settling characteristics, such that it won't settle when the seismic damper 20 is immobile and unstroked for many years. Notably, even with the omission of the lithium hydroxostearate, some antisettling properties may be obtained. This fluid exhibits a moderate viscosity, yet has a high off-state to on-state ratio. However, it does exhibits a significant off-state yield stress, i.e., the "custard" consistency, that provides the excellent anti-settling properties. In operation, once the yield stress is exceeded the fluid acts as a moderate-viscosity fluid in the off-state and as a very viscous fluid in the on-state.

Preferably, the fluid is manufactured by mixing the lithium hydroxystearate and silica into the synthetic hydrocarbon oil and then heating to about 200 degrees C. This allows the lithium hydroxystearate to go into solution. The mix is then cooled and the carbonyl powder is added in a high speed Cowles-type mixer. The inventor herein recognized that this particular fluid has key application in seismic dampers, such as damper 20.

The MR fluid 38 is contained in the controllable passageway 36, the first fluid chamber 32, and the second fluid chamber 34, as well as in an external third chamber 44. The external third chamber 44 is included in an accumulator 46, which also includes a gas charge chamber 48 for pressurizing the MR fluid 38 contained in the first and second chambers 32, 34. The external third chamber 44 and gas charge chamber 48 are separated by flexible partition 45. A small passageway 47 having dimensions of about 0.625 in (15.88 mm) interconnects the third chamber 44 with the first fluid chamber 32 and/or the second fluid chamber 34. The accumulator 46 also allows for expansion and contraction of the MR fluid 38 within the damper 20 but also pressurizes the fluid 38 in the damper 20 such that any cavitation is minimized. The accumulator 46 is preferably pressurized to between 1,000 psi (6,894 Kpa) and 1,500 psi (10,341 Kpa)

preferably with nitrogen gas. The third chamber 44 is substantially dynamically locked out for the vibration frequencies of interest, because of the high pressure in the gas charge chamber 48. The preferred accumulator 46 is manufactured by Hydac Corp. under p/n SB0200-1E4/112F-210CK.

The piston assembly 26 includes a plurality of axially-spaced and alternately-wound coils 40, 40', 40", preferably of which there are three, for generating a plurality of magnetic fields 39, 39', 39" which are directed by preferably tapered and magnetically-soft pole pieces 42, 42', 42", 42"' to act upon the MR fluid 38 contained in the controllable passageway 36, thereby generating rheology changes (an apparent viscosity change) which restricts the flow of the MR fluid 38 through the controllable passageway 36. This creates the variable damping forces. Suitable materials for the poles pieces 42, 42', 42", 42"' and damper body 22 comprise magnetically-soft materials, such as 12L14 low-carbon steel.

A preferably digital controller 50 controls the MR damper 20 via any of a the known algorithms. This may include taking sensor information representative of the movement of the first and second members 21, 23 from sensors 52, 52', which sense horizontal acceleration. Further, displacement or velocity may be measured and provided via a horizontal displacement or velocity sensor 52". Notably, if power is lost, a battery supplies the power requirements of the MR damper 20 and controller 50.

The controller 50 processes the sensor signals from one or more of the sensors 52, 52', 52" according to an algorithm 60 and provides the appropriate output signal (current) to the MR damper 20. Various control algorithms are known to those of skill in the art, such as clipped-optimal control based upon acceleration feedback. A discussion of clipped-optimal control using acceleration feedback may be found in "Modeling and Control of Magnetorheological Dampers for Seismic Response Reduction" by Dyke, Spencer, Sain, and Carlson (Aug. 1, 1996). Other algorithms based upon velocity and/or displacement input may be used. Notably, during a seismic event, the device operates off the DC current of the battery 54, as power is likely lost immediately or shortly after the start of the seismic event. A charger 56 which operates off AC power source 58 periodically charges the Battery 54 to ensure the battery 54 is fully charged.

While several embodiments including the preferred embodiment of the present invention have been described in detail, various modifications, alterations, changes, and adaptations to the aforementioned may be made without departing from the spirit and scope of the present invention defined in the appended claims. It is intended that all such modifications, alterations, and changes be considered part of the present invention.

I claim:

1. A seismic damper for providing controllable damping forces between a first large structural member and a second large structural member during a seismic event, the seismic damper comprising:
   (a) a damper body having at least one aperture formed therein, and an inner diameter forming a portion of a hollow cavity,
   (b) means for attaching said damper body to the first large structural member,
   (c) at least one piston rod slidably received within said at least one aperture,
   (d) means for attaching said at least one piston rod to the second large structural member,
   (e) a piston assembly including a piston core having a plurality of pole pieces formed thereon, a plurality of coils alternately wound about said piston core, said piston assembly having an outer periphery attached to said at least one piston rod and axially moveable within said hollow cavity thereby subdividing said hollow cavity into a first fluid chamber and a second fluid chamber,
   (f) a controllable passageway formed between said inner diameter of said damper body and said outer periphery of said piston assembly,
   (g) a magnetorheological fluid including soft-magnetic particles disbursed within a carrier liquid contained within said controllable passageway, said first fluid chamber, and said second fluid chamber, and
   (h) discrete current generating means for providing current to a plurality of coils, said means adapted to be operable during a seismic event and non-operable between seismic events, said means for providing current to said coils for generating a plurality of magnetic fields which are directed by said plurality of pole pieces to act upon said magnetorheological fluid contained in said controllable passageway thereby generating rheology changes which restrict flow of said magnetorheological fluid through said controllable passageway.

2. The seismic damper of claim 1 wherein said magnetorheological fluid further comprises:
   (a) a synthetic hydrocarbon oil,
   (b) carbonyl iron particles, and
   (c) silica.

3. The seismic damper of claim 1 wherein said magnetorheological fluid further comprises:
   (a) a synthetic hydrocarbon oil,
   (b) carbonyl iron particles, and
   (c) lithium hydroxystearate.

4. The seismic damper of claim 2 wherein said magnetorheological fluid further comprises:
   (a) between 10% and 50% by weight of synthetic oil,
   (b) between 50% and 90% by weight of carbonyl iron,
   (c) between 0.05% and 1% by weight of silica, and
   (d) between 0.05% and 2% by weight of lithium hydroxystearate.

5. The seismic damper of claim 1 wherein said at least one piston rod comprises a first piston rod secured to a first end of said piston assembly and a second piston rod secured to a second end of said piston assembly.

6. The seismic damper of claim 1 wherein at least one of said first and said second fluid chambers interacts with a third fluid chamber through a passage.

7. The seismic damper of claim 6 wherein said third fluid chamber is external.

8. The seismic damper of claim 6 wherein said third fluid chamber is gas charged to an operating pressure of between 1,000 psi and 1,500 psi.

9. The seismic damper of claim 1 wherein said first structural member is a first part of a building and said second structural member is a second part of a building.

10. The seismic damper of claim 1 wherein said first structural member is a first part of a bridge and said second structural member is a second part of a bridge.

11. The seismic damper of claim 1 which is controlled by a digital controller.

12. The seismic damper of claim 11 said digital controller takes inputs from at least one sensor.

13. The seismic damper of claim 12 wherein said digital controller and said seismic damper operate on battery power.

14. The seismic damper of claim 1 wherein said plurality of pole pieces are tapered.

15. The seismic damper as claimed in claim 1 wherein said discrete current generating means is a DC power source.

16. The seismic damper as claimed in claim 1 wherein said discrete current generating means is a battery.

17. The seismic damper as claimed in claim 14 wherein the battery is electrically connected to an alternator and is charged by the alternator.

18. The seismic damper as claimed in claim 16 wherein the battery is electrically connected to an alternator and is charged by the alternator.

19. A seismic damper for providing controllable damping forces between a first large structural member and a second large structural member during a seismic event, the seismic damper comprising:

(a) a damper body having at least one aperture formed therein, and an inner diameter forming a portion of a hollow cavity, (b) means for attaching said damper body to the first large structural member, (c) at least one piston rod slidably received within said at least one aperture, (d) means for attaching said at least one piston rod to the second large structural member, (e) a piston assembly including a piston core having a plurality of pole pieces formed thereon, a plurality of coils alternately wound about said piston core, said piston assembly having an outer periphery attached to said at least one piston rod and axially moveable within said hollow cavity thereby subdividing said hollow cavity into a first fluid chamber and a second fluid chamber, (f) a controllable passageway formed between said inner diameter of said damper body and said outer periphery of said piston assembly, (g) a magnetorheological fluid including soft-magnetic particles disbursed within a carrier liquid contained within said controllable passageway, said first fluid chamber, and said second fluid chamber, and (h) a battery for providing current to a plurality of coils, the battery being selectively operative during a seismic event, to provide current to said coils for generating a plurality of magnetic fields which are directed by said plurality of pole pieces to act upon said magnetorheological fluid contained in said controllable passageway thereby generating rheology changes which restrict flow of said magnetorheological fluid through said controllable passageway.

20. A seismic damper for providing controllable damping forces between a first large structural member and a second large structural member during a seismic event, the seismic damper comprising:

(a) a damper body having at least one aperture formed therein, and an inner diameter forming a portion of a hollow cavity, (b) means for attaching said damper body to the first large structural member, (c) at least one piston rod slidably received within said at least one aperture, (d) means for attaching said at least one piston rod to the second large structural member, (e) a piston assembly including a piston core having a plurality of tapered pole pieces formed thereon, a plurality of coils alternately wound about said piston core, said piston assembly having an outer periphery attached to said at least one piston rod and axially moveable within said hollow cavity thereby subdividing said hollow cavity into a first fluid chamber and a second fluid chamber, (f) a controllable passageway formed between said inner diameter of said damper body and said outer periphery of said piston assembly, (g) a magnetorheological fluid including soft-magnetic particles disbursed within a carrier liquid contained within said controllable passageway, said first fluid chamber, and said second fluid chamber, and a battery for providing current to a plurality of coils, the battery being selectively operative during a seismic event, to provide current to said coils for generating a plurality of magnetic fields which are directed by said plurality of pole pieces to act upon said magnetorheological fluid contained in said controllable passageway thereby generating rheology changes which restrict flow of said magnetorheological fluid through said controllable passageway.

* * * * *